United States Patent [19]

Yang et al.

[11] Patent Number: 5,596,575

[45] Date of Patent: Jan. 21, 1997

[54] AUTOMATIC NETWORK SPEED ADAPTER

[75] Inventors: Henry S. Yang, Andover; Donald L. Post, Leominster, both of Mass.; Wen-Yi Huang, Taoyuan, Taiwan

[73] Assignee: Digital Equipment Corporation, Maynard, Mass.

[21] Appl. No.: 435,923

[22] Filed: May 5, 1995

[51] Int. Cl.⁶ .......................................... H04J 3/22
[52] U.S. Cl. ................................................ 370/468
[58] Field of Search ............................. 370/84, 79, 95.1, 370/85.2, 32.1, 85.3; 379/58, 100

[56] References Cited

U.S. PATENT DOCUMENTS

| | | | |
|---|---|---|---|
| 5,442,629 | 8/1995 | Geyer et al. | 370/84 |
| 5,488,609 | 1/1996 | Hluchyj et al. | 370/84 |
| 5,502,752 | 3/1996 | Averbuch et al. | 370/84 |
| 5,509,050 | 4/1996 | Berland | 379/100 |

*Primary Examiner*—Douglas W. Olms
*Assistant Examiner*—Shick Hom
*Attorney, Agent, or Firm*—Kenneth F. Kozik

[57] ABSTRACT

A network adapter for interfacing between a communication network and a host computer operating as a network device, and a method of operation of these components. The adapter is initially conditioned to transmit at a lower of two possible speeds, such as 10 Mbps instead of 100 Mbps, and then senses at which speed the network is operating, before matching to this sensed speed, either the higher speed or the lower speed. If the sensed speed is the lower speed, the adapter transmits a burst of high-speed signals and senses again for high-speed operation. If the network has not switched to high-speed operation, the adapter is conditioned for low-speed operation. After the adapter is conditioned for low-speed or high-speed operation, the network speed is continually sensed and, if the network is not operating at the selected speed for some preselected period of time, the adapter is returned to its initial low-speed state to begin network speed sensing over again.

5 Claims, 5 Drawing Sheets

AUTOMATIC NETWORK SPEED ADAPTER

BACKGROUND OF THE INVENTION

This invention relates generally to computer networks and, more particularly, to networks that employ an access protocol referred to as Carrier Sense Multiple Access with Collision Detection (CSMA/CD). One widely used CSMA/CD protocol is commonly known as Ethernet. The CSMA/CD protocol is defined in ANSI/IEEE Std. 802.3, published by the Institute of Electrical and Electronics Engineers, Inc., 345 East 45th Street, New York, N.Y. 10017, and referred to in this specification as "the IEEE standards."

Under the CSMA/CD rules for access to a network bus or cable, which will be referred to as the channel, any node or station wishing to transmit must first "listen" to make sure that the channel is clear before beginning to transmit. All nodes on the network have equal priority of access and may begin transmitting as soon as the channel is clear and a required inter-packet delay has elapsed. However, if a first node that has started transmitting detects a "collision" with a transmission from another node, the first node continues transmitting for a short time to make sure that all nodes wishing to transmit will detect the collision. Every other node detecting the collision also continues to transmit for a short time. Then each node that has detected a collision terminates transmission of the packet or frame. The nodes involved in the collision wait for the required interpacket delay and then select random, and therefore usually different, delay times, referred to as backoff times, before trying transmission of the same packet again.

The IEEE standards permit station equipment (or data terminal equipment, DTE) to be defined to include an integral media attachment unit (MAU) for connection to a commonly used medium, such as a twisted-pair medium. In the IEEE standards, this mode of operation with a twisted-pair medium is referred to as 10BASE-T operation (pronounced ten-base-tee), and the connector for coupling to the twisted-pair medium is referred to as a 10BASE-T connector. The prefix "10" in 10BASE-T refers to the nominal transmission rate of 10 megabits per second (Mbps). This transmission rate has been adequate for most network users and continues to be adequate for many. However, as the number of personal computer (PC) users added to networks continues to increase, and the computing power of PCs also increases, there is a greater demand for higher speeds in PC-based local area network (LAN) applications. The IEEE 802.3 standards committee has published a new proposed standard that will operate at 100 Mbps. It will be known as the Fast Ethernet and, for connection with twisted-pair networks, will use the term 100BASE-T. The 100BASE-T system has the advantage of providing ten times the speed without change of existing conductors in already established networks, and without major change in existing design. The new standard is based on the same proven CSMA/CD Media Access Control (MAC) protocol layer that is the core of the 10 Mbps Ethernet.

During a period of introduction of the new 100 Mbps standard, and probably for some time to come, there will be a mix of the old and new standards. When connecting a station to a network repeater, some technique must be provided to ensure that they are using the same protocol, i.e. 10 Mbps or 100 Mbps. If a 100 Mbps station transmitter is connected to a 10 Mbps repeater, the 10 Mbps network can suffer severe performance degradation. Switching implementations that have been proposed typically require that transmit and receive operations be shut down to allow switching from one speed of operation to the other. For example, transmit and receive queues need to be initialized after switching. This may also cause some system degradation in the form of loss of message packets.

A new proposed IEEE Standard (802.3 u) specifies an automatic configuration protocol known by the name NWay. The NWay protocol is a physical layer signaling protocol for configuration advertisement and negotiation between two stations at opposite ends of a link segment of a network. The protocol allows a device to advertise its modes of operation to a remote device, and to detect the capabilities of the remote device. Each device uses a fixed, standardized priority list of capabilities, so that the two devices can select a common mode of operation. A series of "link pulses" are used to transmit configuration information and for negotiation of an agreed protocol. A custom chip is needed to implement the NWay protocol and the chip must be installed in both devices at the ends of a link segment.

Other automatic configuration interfaces include the Intel 10/100 PCI Adapter and the 3Com 10/100 PCI Adapter, which appears to be similar to the Intel design. No published literature is available for these products, but they both appear to suffer significant drawbacks in comparison with the present invention.

It will be appreciated from the foregoing that there is still a need for an autoconfiguration protocol that chooses between normal and high-speed transmission rates automatically, with minimal system degradation and minimal packet loss. The present invention is directed to these ends.

SUMMARY OF THE INVENTION

The present invention resides in a method for automatically reconfiguring a network adapter to match its operating speed to that of a network to which the adapter is connected. Briefly, and in general terms, the method comprises the steps of initially conditioning the adapter to operate at a lower speed; determining the network is operating at the lower speed; if the network is determined to be not operating at the lower speed, determining whether the network is operating at a higher speed; if the network is determined to operating at the higher speed, conditioning the adapter to operate at the higher speed; and if the network is determined to operating at the lower speed, transmitting from the adapter a burst of signals at the higher speed. After transmitting the signals at the higher speed, the method continues by determining whether the network has switched to the higher speed, and, if so, conditioning the adapter to operate at the higher speed. If it is determined that the network has not switched to the higher speed, the adapter is conditioned to operate at the lower speed.

The method may also include the steps of enabling normal transmission and reception of data after the adapter has been conditioned to operate at the lower or the higher speed; continually testing to determine that the network is still operating at the speed for which the adapter was conditioned; and if the network is determined to have stopped operating at the speed for which the adapter was conditioned for a preselected time period, then returning to the step of initially conditioning the adapter to operate at the lower speed. The preselected time period is chosen to minimize disruption due to transient changes in network operation.

The method may also include the step of disabling normal transmission and reception of data immediately prior to the step of returning to initially conditioning the adapter to operate at the lower speed.

The invention may also be defined as a novel network adapter and associated device driver for automatically reconfiguring a network adapter to match its operating speed to that of a network to which the adapter is connected. The device comprises a network connector, for connecting the adapter to a network medium; a higher-speed transceiver and a lower-speed transceiver; a transmit switch, for connecting a selected one of the transceivers in transmit mode to the network connector; a first status line coupled to the lower-speed transceiver, to provide an indication of network operation at the lower speed; a second status line coupled to the higher-speed transceiver, to provide and indication of network operation at the higher speed; and network adapter driver logic for performing the desired control functions on the adapter. More specifically, the network adapter driver logic includes means for placing the adapter in an initial speed selection state, by controlling the transmit switch to select the lower-speed transceiver for transmission onto the network; means operative only if the first status line indicates network operation at the lower speed, for initiating transmission of a burst of signals at the higher speed; and means for controlling the transmit switch to select a transceiver for transmission based on the conditions of the status lines.

The adapter driver may also include means for enabling normal transmission and reception of data after the means for controlling the transmit switch has selected a transceiver; means for continually testing to determine whether the network has stopped operating at the selected speed for a preselected time; and means operative only if the network is determined to have stopped operating at the selected speed for the preselected time, for returning the adapter to an initial speed selection state. The preselected time period is chosen to minimize disruption due to transient changes in network operation. The network adapter driver logic may further include means for disabling normal transmission and reception of data if the network is determined to have stopped operating at the selected speed for the preselected time.

It will be appreciated from the foregoing that the present invention represents a significant advance in the field of automatic configuration of network adapters to communicated over networks having different speeds of operation. In particular, the invention provides a network adapter that defaults to the slower speed of operation, to avoid misconfiguration problems, then determines the speed of operation of the network switches to it automatically. If a low speed of operation is detected, the adapter transmits a burst of idle signals at the higher speed, to encourage operation at the higher speed. Further, after selection of the appropriate speed of operation the adapter remains conditioned to transmit at that speed, even during transient disconnections from the network. Other aspects and advantages of the invention will become apparent from the following more detailed description, taken in conjunction with the accompanying drawings.

DESCRIPTION OF THE PREFERRED EMBODIMENT

Figure 1:
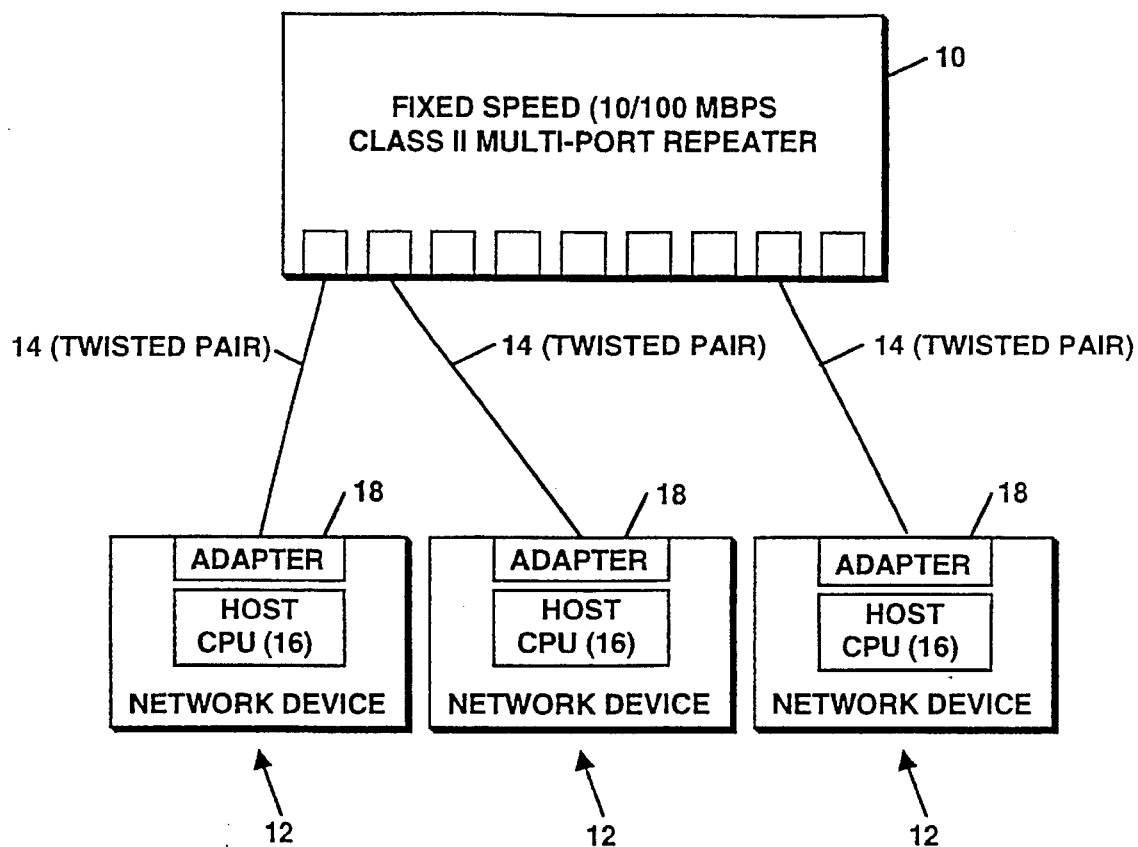
FIG. 1 is block diagram showing one environment in which the present may be employed, including three host computers connected to a multi-port repeater.

As shown in the drawings for purposes of illustration, the present invention pertains to an automatic sensing and configuration protocol for connection of a device to a network that may be operating at either of two speeds, such as 10 Mbps (megabits per second) and 100 Mbps. FIG. 1 shows a typical repeater configuration in which the invention may be used. The configuration includes a fixed speed (e.g. 10 Mbps or 100 Mbps) Class II multi-port repeater, indicated by reference numeral 10, and a plurality of network devices 12 connected to the repeater by a transmission medium 14, such as twisted pairs of conductors. Each of the devices 12 includes a host CPU (central processing unit) 16 and a network interface or adapter 18. Briefly, the network adapter of the invention, functioning under control of a device driver installed in the CPU 16, automatically senses the speed of operation of the repeater 10 and configures itself to operate at that speed with minimal disruption of operation or system degradation.

Figure 2:
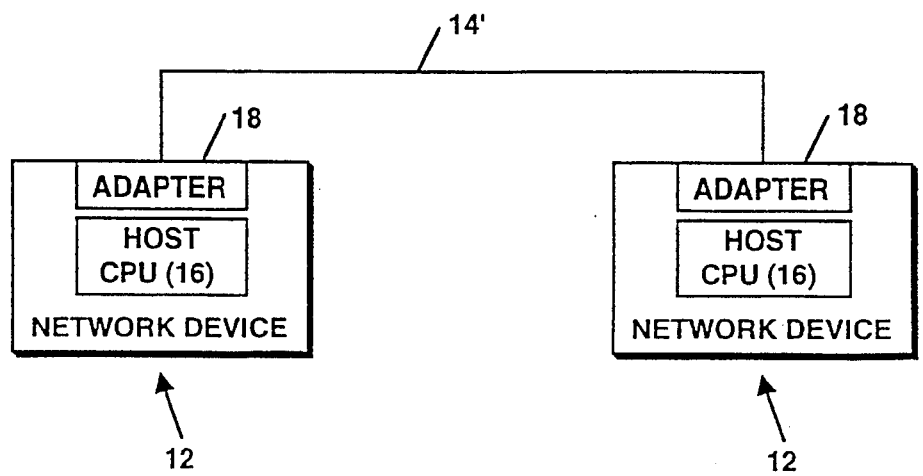
FIG. 2 is another block diagram showing another environment in which the present invention may be used, including two host computers connected together over a single link.

FIG. 2 shows two of the same devices 12 connected by a single communication link 20 in a point-to-point configuration. As will be further discussed below, the adapters 18 can be configured to operate either at 10 Mbps or 100 Mbps in either full-duplex or half-duplex mode in this point-to-point configuration.

Figure 3:
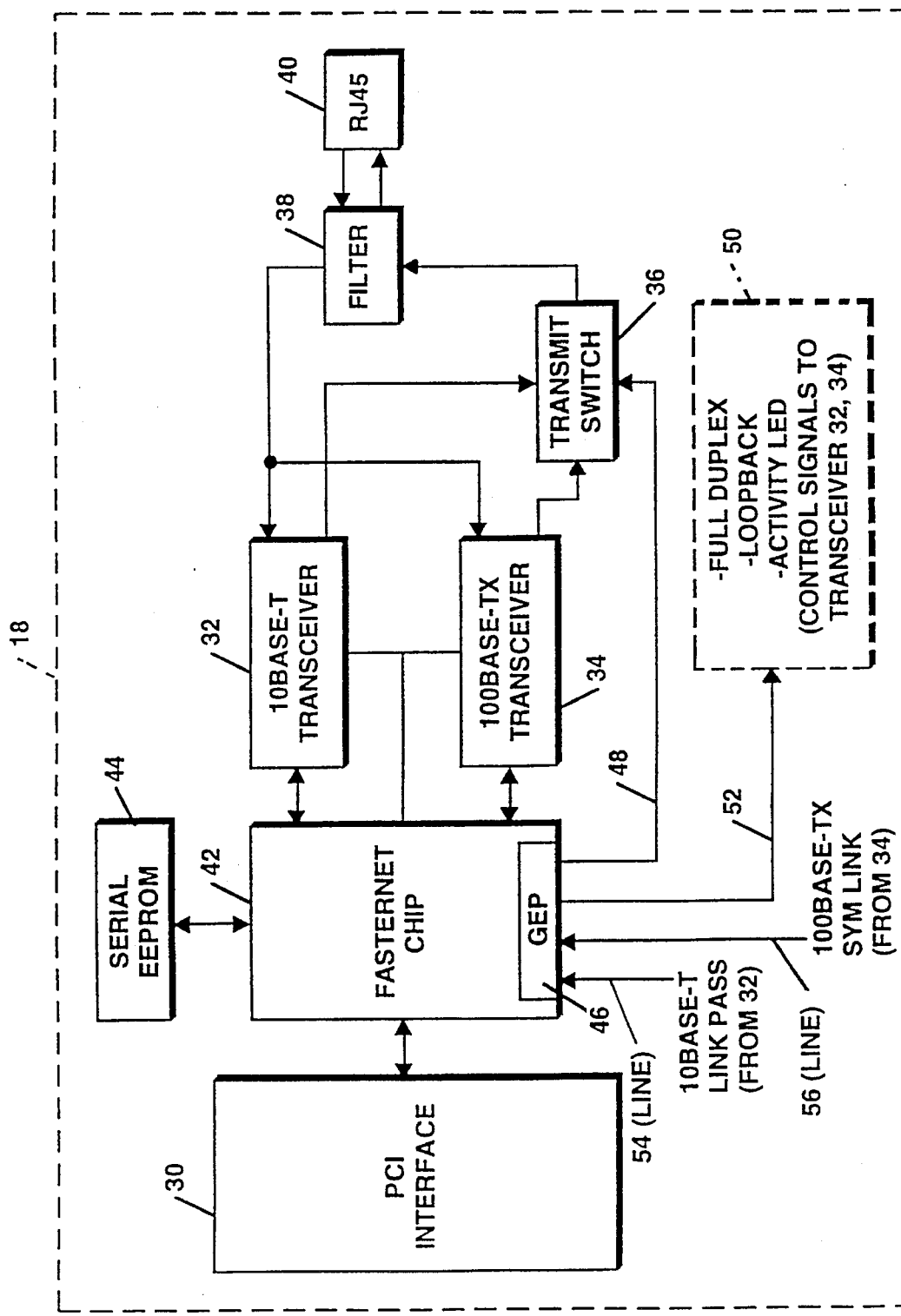
FIG. 3 is a block diagram of a network adapter in which the present invention is implemented.

The adapter 18 of the invention is implemented as a printed circuit board that is plugged into a standard peripheral component interconnect (PCI) slot in a personal computer, workstation or other system having a PCI slot. The principal components of the adapter 18 are, as shown in FIG. 3, a standard PCI interface 30, for connecting the network interface board 18 to the CPU 16, a 10BASE-T transceiver 32, a 100BASE-TX transceiver 34, a two-state transmit switch 36 for selecting between the two transceivers 32 and 34 in the transmit mode, a filter 38 for wave shaping and filtering the transmitted and received signals, and a standard RJ45 (modular telephone) connector 40 for connecting to the transmission medium. Flow of data and control signals pertaining to the adapter 18 is directed by a standard integrated circuit chip 42, which is referred to as the FasterNet chip (Digital Equipment Corporation part no. DE21140). Associated with the chip 42 are a memory 44 in the form of an electronically erasable programmable read-only memory (EEPROM) used principally to store an identification code in the form of a 48-bit address uniquely identifying the adapter 18, and a general purpose register (GEP) 46 through which certain control and status signals are passed, one of which is a control signal on line 48 to control the position of the transmit switch 36.

Other control signals output through the GEP 46 are indicated diagrammatically by block 50, which receives signals from the GEP over line 52. These are control signals directed to the two transceivers 32 and 34, and are used to switch the transceivers to different modes of operation, including full duplex mode and loopback mode, and to control an activity light emitting diode (LED) in each transceiver. The GEP 46 also receives status information from the transceivers, specifically, a 10BASE-T link pass signal over line 54 from transceiver 32 and a 100BASE-TX sym. link signal over line 56 from transceiver 34. These signals provide the device driver, which resides on the CPU 16, with information concerning operation of the transceivers at one or the other of the two possible speeds.

Figure 4A:
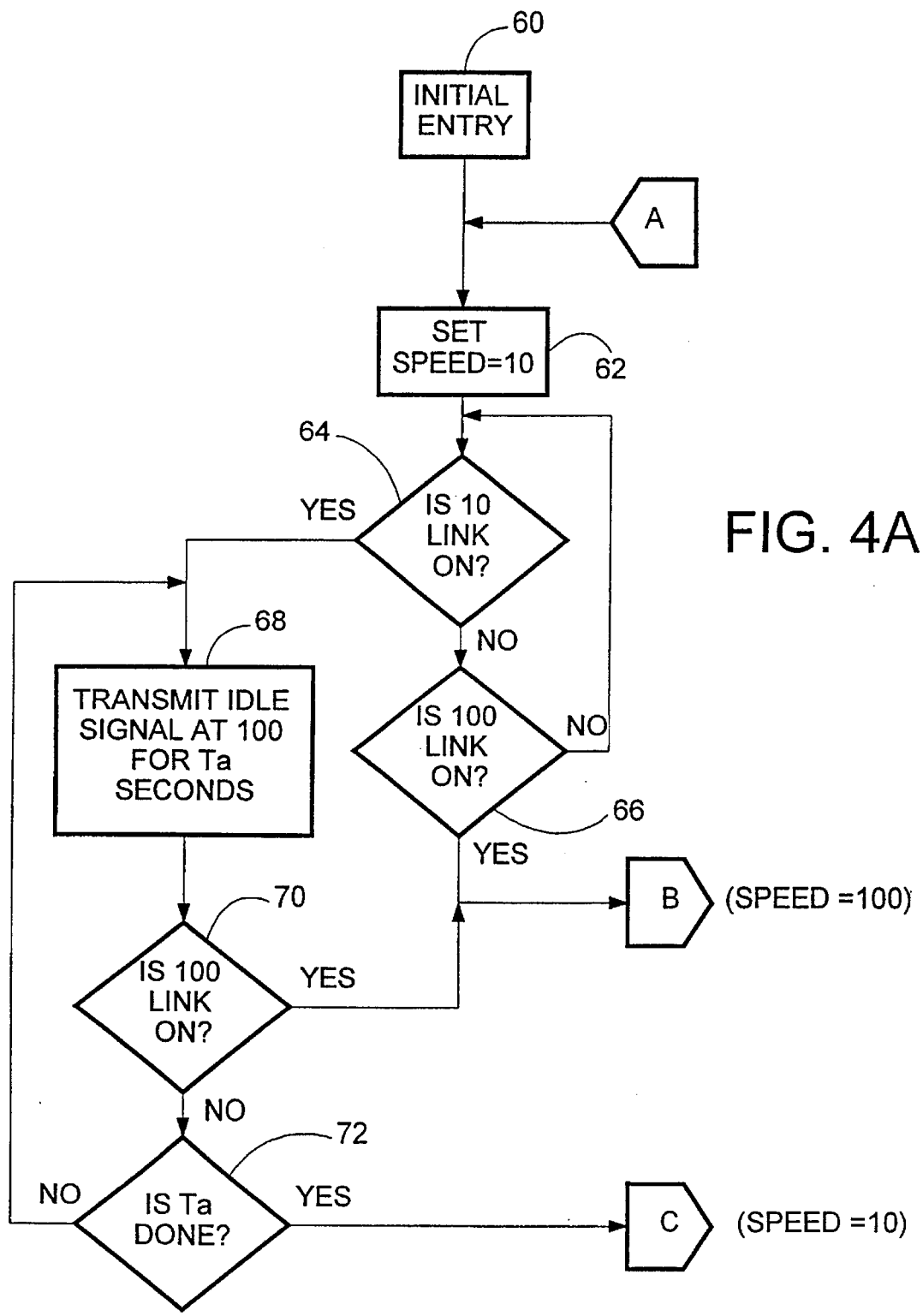
FIGS. 4A, 4B and 4C together comprise a flowchart of the functions performed by the present invention.

The auto-sensing and auto-configuration functions of the adapter 18 will be best understood from the functional flowchart depicted in FIG. 4. These functions are performed by the device driver that is resident in the CPU 16 and controls operations of the adapter 18 through the PCI interface 30.

On initial entry to the device driver, as indicated at 60, the speed of operation is set to 10 Mbps, as indicated at 62. This is always the default setting of the device driver and avoids any degradation that might result from transmitting at 100 Mbps on a 10 Mbps network. Then, as indicated in decision block 64, the 10 Mbps transceiver 32 is checked to determine whether it has received a valid 10 Mbps link pass signal. For 10BASE-T operation, a valid link pass signal consists of receiving a predefined number (such as two) of special link test signals, or one or more receive packets. When the 10BASE-T transceiver 32 receives the link test signals, status line 54 through the GEP 46 conveys this information back to the device driver. If operation is not detected at 10 Mbps, the next test performed, as shown in decision block 66, is to determine whether the 100 Mbps transceiver 34 has received a valid link pass signal: This consists of receiving a valid idle signal for a predefined period of time, such as 350 microseconds. If the 100BASE-TX transceiver 34 receives a valid idle signal for the predefined time, this information is passed through the status line 56 to the GEP 46 and thence back to the device driver. If neither the 100 Mbps link nor the 10 Mbps link is detected as being on, the driver keeps looping through these two tests (64 and 66) until operation is detected at one of the speeds.

Figure 4B:
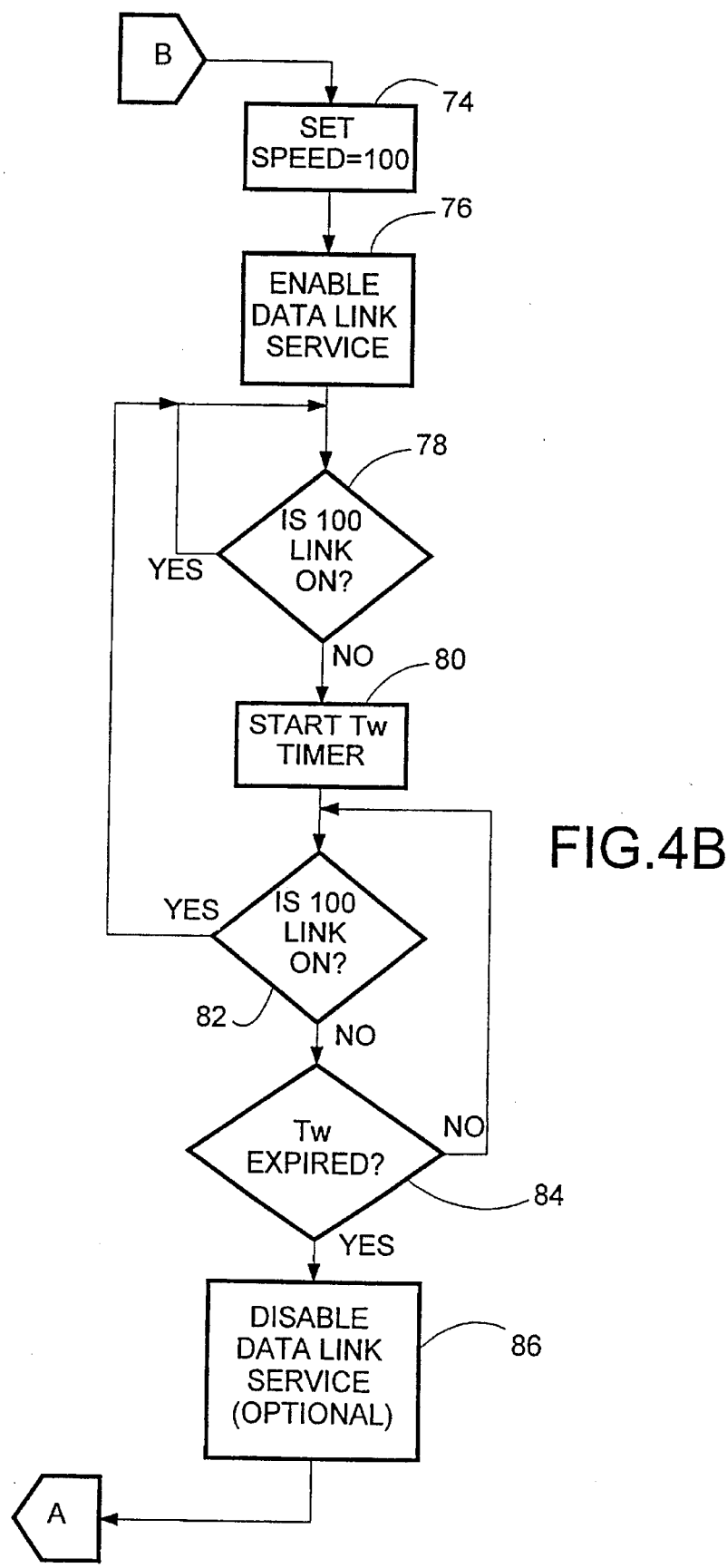

If the 100 Mbps link is determined to be on, in block 66, processing continues as shown in FIG. 4B, to be described below. If the 10 Mbps link is determined to be on, in block 64, the device driver instructs the 100BASE-TX transceiver 34 to transmit an idle signal at 100 Mbps for a preselected time interval $T_a$ seconds, such as three seconds, as shown at 68. This short burst of 100 Mbps operation is intended to try to force the device at the other end of the communication link to join in operation at the higher speed of 100 Mbps. If the 100 Mbps speed is then detected as being on, i.e. a valid idle signal is received for a predetermined time, as indicated in block 70, high speed operation is initiated by transferring through connector B to the functions shown in FIG. 4B. If the interval $T_a$ is completed without detecting operation at 100 Mbps, as determined in decision block 72, operation at 10 Mbps is presumed and the functions in FIG. 4C are performed, as indicated by the path through connector C.

FIG. 4B shows the functions performed after high-speed operation has been detected. First, the speed is set at 100 Mbps, as indicated in block 74. Then, as indicated in block 76, data link service is enabled. This simply means that transmit and receive packets of data are allowed to be processed through the adapter 18. The packets are queued for the adapter in a conventional and well known fashion, and normal operation of the adapter continues. The remaining series of decision blocks in FIG. 4B are to detect subsequent non-operation at 100 Mbps for a period of $T_w$ seconds, e.g. five seconds. Failure to detect the 100 Mbps mode for longer than five seconds is taken as an indication of disconnection from the network. (In conventional designs, any detection of non-operation at a given speed is sufficient to trigger a change in the adapter speed.) If 100 Mbps operation is detected in block 78, the device driver loops on this decision until its result becomes negative. Then a $T_w$ timer is started, as indicated in block 80, and a check is again made, in block 82, for the 100 Mbps mode. If the higher speed is detected at this point, the logic returns to decision block 78. If no 100 Mbps mode is detected, the $T_w$ timer is checked (in block 84) and the logic loops through blocks 82 and 84 until either the 100 Mbps link comes on again or the $T_w$ timer expires. In the latter case, this means that 100 Mbps operation has been off for at least $T_w$ seconds. Optionally, data link service is then disabled, as indicated in block 86, and return is made through connector A to block 62 in FIG. 4A, to begin operation again as if for the first time.

Figure 4C:
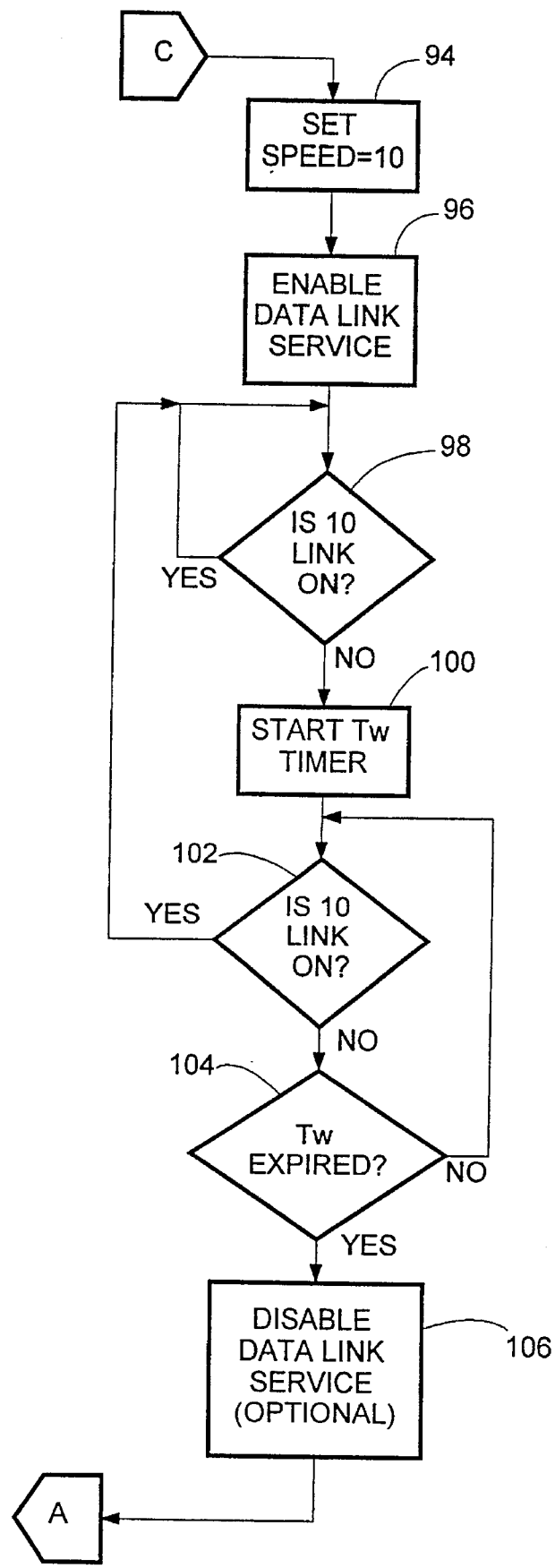

The logical functions performed when lower speed operation is detected are shown in FIG. 4C, in which blocks 94, 96, 98, 100, 102, 104 and 106 are equivalent to blocks 74, 76, 78, 80, 82, 84 and 86, respectively, except for the speed differences involved. Therefore, the logic represented by FIG. 4C enables operation at 10 Mbps, enables data link service, and maintains operation in this mode until there is a failure to recognize 10 Mbps operation for a period of $T_w$ seconds continuously.

The functions described above are performed under control of a software device driver in the CPU 16, by receiving adapter status conditions through the PCI interface 30 and transmitting control signals back through the PCI interface. In particular, receipt of 10BASE-T link pass signals are recognized in the 10BASE-T transceiver 32 and passed to the FasterNet chip 42 over line 54 and through the GEP register 46. Similarly, 100BASE-TX sym. link signals are detected in the 100BASE-TX transceiver 34 and passed to the FasterNet chip 42 over line 56 and through the GEP register 46. Signals received from the network pass through the RJ45 network connector 40 and are fed to both transceivers 32 and 34. Signals transmitted onto the network are generated in one or the other of the transceivers 32 and 34, depending which one is connected to the network through the transmit switch 36. The switch 36 is controlled by a signal on line 48 from the GEP register 46 of the FasterNet chip 42. Data packets, including transmit packets and receive packets, are also transmitted through the PCI interface 30, the chip 42 and the transceivers 32 and 34.

The network adapter of the invention has a number of significant advantages over prior art techniques for adapting automatically to a detected speed of operation. First, when sensing an unknown mode of operation, the device defaults initially to the 10 Mbps mode to avoid the most serious misconfiguration problem: transmitting at 100 Mbps into a 10 Mbps system. A second advantage is that the device of the invention tries to force operation at 100 Mbps for a predefined short period of time, to encourage the device at the other end of the communication link to operate at the higher speed. Another major advantage is that disconnects from the network do not immediately result in a change of transmission mode. More specifically, if the adapter detects loss of operation at the last-detected speed mode, no action is taken until a timer ($T_w$) has expired. This allows reconnection at the same speed mode if the disconnection resulted from a transient effect. Thus this feature provides better transient noise or interrupt tolerance.

It will be appreciated from the foregoing that the present invention represents a significant advance in the field of network communications in general, and more particularly in the field of automatically configuring network adapters. The automatic adapter of the invention allows network host CPUs to be coupled to networks without regard for the network speed. The adapter automatically senses and adjusts to either of two standard speeds of operation. It will also be appreciated that, although a specific embodiment of the invention has been described in detail for purposes of illustration, various modifications may be made without departing from the spirit and scope of the invention. Accordingly, the invention should not be limited except as by the accompanying claims.

We claim:

1. A method for automatically reconfiguring a network adapter to match its operating speed to that of a network to which the adapter is connected, the method comprising the steps of:

provided the adapter with a connection to a device driver;

initially setting the adapter to operate at a lower speed by the device driver;

determining whether the network is operating at the lower speed;

if the network is determined to be not operating at the lower speed, determining whether the network is operating at a higher speed;

if the network is determined to operating at the higher speed, setting the adapter to operate at the higher speed by the device driver; and if the network is determined by the device driver to be operating at the lower speed, having the device driver instruct the adapter to deliver a burst of signals at the higher speed, then determining by the device driver whether the network has switched to the higher speed, and setting the adapter to operate at the higher speed by the device driver if the network has switched to the higher speed, or at the lower speed if the network has not switched to the higher speed.

2. A method as defined in claim 1, and further comprising the steps of:

enabling transmission and reception of data after the adapter has been conditioned to operate at the lower or the higher speed by the device driver;

continually testing to determine that the network is still operating at the speed for which the adapter was set; and if the network is determined to have stopped operating at the speed for which the adapter was set for a preselected time period by the device drive, then returning to the step of initially setting the adapter to operate at the lower speed;

whereby the preselected time period is chosen to minimize disruption due to transient changes in network operation.

3. A method as defined in claim 2, and further comprising the step of:

disabling transmission and reception of data immediately prior to the step of returning to initially the adapter to operate at the lower speed.

4. A network adapter and associated device driver for automatically reconfiguring a network adapter to match its operating speed to that of a network to which the adapter is connected, comprising:

a network connector, for connecting the adapter to a network medium;

a higher-speed transceiver and a lower-speed transceiver;

a transmit switch, for connecting a selected one of the transceivers in transmit mode to the network connector;

a first status line coupled to the lower-speed transceiver, to provide an indication of network operation at the lower speed;

a second status line coupled to the higher-speed transceiver, to provide and indication of network operation at the higher speed;. and network adapter driver logic, including:

means for placing the adapter in an initial speed selection state, by controlling the transmit switch to select the lower-speed transceiver for transmission onto the network, means operative only if the first status line indicates network operation at the lower speed, for initiating transmission of a burst of signals at the higher speed;

means for controlling the transmit switch to select a transceiver for transmission based on the conditions of the status lines;

means for enabling transmission and reception of data after the means for controlling the transmit switch has selected a transceiver;

means for continually testing to determine whether the network has stopped operating at the selected speed for a preselected time;

means operative only if the network is determined to have stopped operating at the selected speed for the preselected time, for returning the adapter to an the initial speed selection state;

whereby the preselected time period is chosen to minimize disruption due to transient changes in network operation.

5. A network adapter and associated device driver as defined in claim 4, wherein the network adapter driver logic further includes:

means for disabling transmission and reception of data if the network is determined to have stopped operating at the selected speed for the preselected time.

* * * * *